(12) United States Patent
Meredith et al.

(10) Patent No.: US 11,051,242 B2
(45) Date of Patent: Jun. 29, 2021

(54) FEDERATING MOBILE WIRELESS NETWORKS USING AUCTIONS

(71) Applicants: AT&T Intellectual Property I, L.P., Atlanta, GA (US); AT&T Mobility II LLC, Atlanta, GA (US)

(72) Inventors: Sheldon Meredith, Roswell, GA (US); Umut Akyol, Highland Park, NJ (US); Jason Summers, Plano, TX (US); Zachary Meredith, Roswell, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 32 days.

(21) Appl. No.: 16/454,211

(22) Filed: Jun. 27, 2019

(65) Prior Publication Data
US 2020/0413325 A1 Dec. 31, 2020

(51) Int. Cl.
*H04W 48/18* (2009.01)
*H04W 48/16* (2009.01)
*H04W 48/20* (2009.01)
H04W 88/06 (2009.01)
H04W 36/08 (2009.01)
(Continued)

(52) U.S. Cl.
CPC ........... *H04W 48/18* (2013.01); *H04W 48/16* (2013.01); *H04W 48/20* (2013.01); *H04W 16/14* (2013.01); *H04W 36/08* (2013.01); *H04W 36/14* (2013.01); *H04W 36/24* (2013.01); *H04W 36/26* (2013.01);
(Continued)

(58) Field of Classification Search
CPC ..... H04W 36/08; H04W 36/14; H04W 36/24; H04W 36/26; H04W 36/30; H04W 36/36; H04W 48/16; H04W 48/18; H04W 48/20; H04W 88/06
See application file for complete search history.

(56) References Cited

U.S. PATENT DOCUMENTS

| 6,400,946 B1 * | 6/2002 | Vazvan | H04M 15/8044 455/432.1 |
| 2007/0037603 A1 * | 2/2007 | Dravida | H04W 76/15 455/552.1 |

(Continued)

*Primary Examiner* — Kevin C. Harper
(74) *Attorney, Agent, or Firm* — Amin, Turocy & Watson, LLP

(57) ABSTRACT

Spectrum resource sharing management is described, e.g., a user equipment can determine a metric representative of a quality of a communication signal received by the user equipment, wherein the communication signal is received via a first mobile network operated by a first mobile network operator entity. In response to the metric being determined to be below a threshold, the user equipment can scan a group of frequency bands. The user equipment can receive a broadcast signal from a network node device via a frequency band of the group of frequencies, wherein the broadcast signal comprises a performance parameter and cost information, and wherein the network node device is associated with a second mobile network operated by a second mobile network operator entity. In response to an evaluation of the performance parameter and the cost information, the user equipment can determine whether to select the network node device to engage in cellular transmissions between the user equipment and the network node device.

8 Claims, 13 Drawing Sheets

(51) Int. Cl.
    *H04W 36/24*    (2009.01)
    *H04W 36/26*    (2009.01)
    *H04W 36/30*    (2009.01)
    *H04W 36/36*    (2009.01)
    *H04W 36/14*    (2009.01)
    *H04W 16/14*    (2009.01)

(52) U.S. Cl.
    CPC ............ *H04W 36/30* (2013.01); *H04W 36/36* (2013.01); *H04W 88/06* (2013.01)

(56) References Cited

U.S. PATENT DOCUMENTS

| | | | |
|---|---|---|---|
| 2007/0160007 A1* | 7/2007 | Wang | H04W 36/00837 370/331 |
| 2009/0082019 A1* | 3/2009 | Marsico | H04W 48/18 455/435.2 |
| 2013/0225123 A1* | 8/2013 | Adjakple | H04L 12/1464 455/406 |
| 2014/0004886 A1* | 1/2014 | Gillett | H04W 4/021 455/456.6 |
| 2014/0357218 A1* | 12/2014 | Andrianov | H04W 4/24 455/406 |
| 2020/0021984 A1* | 1/2020 | Nagao | H04W 8/183 |

* cited by examiner

FEDERATING MOBILE WIRELESS NETWORKS USING AUCTIONS

TECHNICAL FIELD

The present application relates generally to the field of wireless communication and, more specifically, to spectrum resource sharing management.

BACKGROUND

Cellular communications technology, including radio access technology, has grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed in attempts to fulfill the demand for exponentially increasing data traffic, and to handle a very wide range of use cases and requirements, including among others, mobile broadband (MBB) services, enhanced mobile broadband (eMBB) services, and machine type communications (e.g., involving Internet of Things (IOT) devices). Additional technological growth includes 4K video, augmented reality, cloud computing, industrial automation, and vehicle to vehicle (V2V). As a consequence, mobile wireless communication networks are constantly being capacity-challenged as increasing numbers of mobile devices are data-enabled and the number and types of data services increase dramatically.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
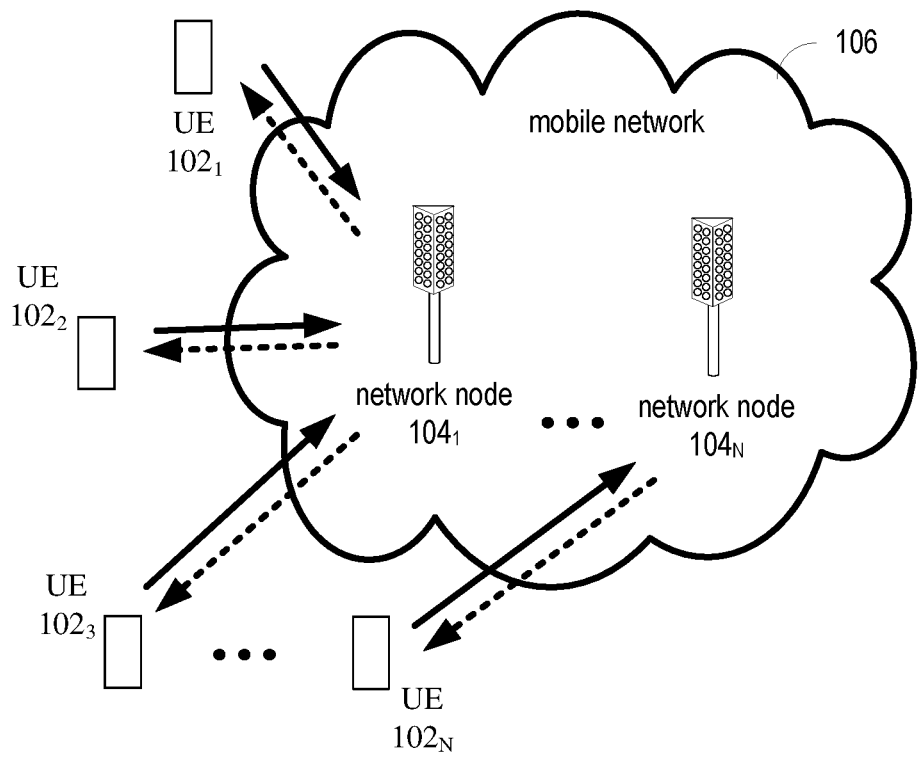
FIG. 1 illustrates an example wireless communication system having a network node (which can also be referred to as a network node device) and user equipment (UE) in accordance with various aspects and example embodiments (also referred to as non-limiting embodiments) of the present application.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., network management device, gateway device, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 12 and FIG. 13.

Attempting to meet increasing mobile capacity demands by adding more wireless mobile network node devices (e.g., network node $104_{1-n}$) within a given bandwidth can also lead to increases in radio interference in the same area. This radio interference can have a direct impact on coverage, link quality, and data throughput. Not only can there be a practical limit to the density of base stations due to handoff speeds, but the cost of adding network nodes, along with ongoing operation costs related to those network nodes, can be high. The throughput of any wireless connection is fundamentally driven by the ratio of signal-to-noise plus interference (S/(I+n)). The S/(I+n) decreases exponentially with distance from a network node transceiver for two reasons. First, the signal strength, S, falls with an exponent typically between 3 and 5 with distance. Unlike free space where twice the distance implies one fourth of the power, at a fourth power exponent, twice the distance implies one sixteenth the power. Next, interference, I, from neighboring base stations hosting co-channel transceivers increases exponentially as well. Consequently, the ratio S/(I+n) will almost always decrease at a fourth power or higher and typically at a fifth power or higher. The distance from a base station is a key driver to throughput and capacity. A mobile network operator (MNO) entity (e.g., AT&T, Verizon Wireless, Sprint, T-Mobile, U.S. Cellular, etc.) can build three times as many base stations to roughly double a carrier's capacity, but, as mentioned above, when the mobile network operator builds more base stations, this can also lead to increased interference.

As one way of reducing direct wireless mobile network demand, wireless carriers have been "offloading" mobile traffic (e.g., often referred to as "cellular data" traffic) onto fixed packet networks, which include digital subscriber line (DSL) service(s) offered through telephone companies, data over cable services (e.g., broadband services over the networks traditionally provided by cable television operators), and fiber to the home (FTTH) networks. This offloading entails enabling mobile devices to switch to a Wi-Fi network for transmissions when a Wi-Fi network is available via Wi-Fi access points associated with CPE attached to a fixed packet network. In addition to being able to transmit data packets via the Wi-Fi network, some UEs are enabled for Wi-Fi calling (e.g., have a Wi-Fi calling client), and thus are operable for making Wi-Fi calls if connected to a Wi-Fi network. For example, a subscriber identity can use their mobile phone's cellular data connection, but then when the subscriber identity is at their home, the mobile phone switches to using the subscriber identity's home WLAN. Or, the mobile traffic has been offloaded to "open" Wi-Fi networks, e.g., Wi-Fi networks in which a password is not required in order to access the wireless network, such as one would find at Starbucks or McDonalds.

Also, to address increasing cellular demand, some entities have called for the identification of new technologies and methods that would allow for the sharing of the radio frequency spectrum that has already been allocated to MNOs (that is, sharing spectrum across MNOs). Currently, the sharing of radio frequency (RF) bands of the electromagnetic spectrum (e.g., RF spectrum) used for wireless communications is regulated by government entities in most countries, in a spectrum management process known as frequency allocation (also referred to as spectrum allocation), whereby government entities (e.g., the Federal Communications Commission (FCC) and the National Telecommunications and Information Administration (NTIA)) allocate frequency bands (e.g., each band comprising a frequency range) within the RF spectrum to various organizations and entities, including MNOs. Thus, for example, a first frequency range (e.g., 10-15 MHz) can be allocated to a first MNO (e.g., AT&T), while a second frequency range (e.g., 15-20 MHz) can be allocated to a second MNO (e.g., Verizon), and so on. A network node device (e.g., a network node) of AT&T, and AT&T user equipment (UEs), use the frequencies within the first frequency range allocated to AT&T for communications. A network node device of Verizon, and Verizon UEs, use the frequencies within the second frequency range allocated to Verizon.

However, a network architecture that is simple and efficient (which can lower development and operational costs) that enables the sharing of allocated spectrum to improve spectrum utilization, while based on the current spectrum sharing architecture, can be challenging, as it seeks to address utilization rates to fulfill potential user device access requests and enable fair sharing of allocated spectrum while preventing conflicts (e.g., interference, challenges for the same frequency allocation, etc.). As such, any kind of frequency sharing can present a variety of business issues, but there exists the potential that the mobile wireless businesses would be more profitable for wireless operators, and availability of service can be increased as a result of increasing amounts of data being moved across wireless mobile networks without corresponding substantial increases in costs.

In accordance with various aspects and example embodiments of the present application as described herein, a user equipment (UE) registered with a first mobile network determines whether UE determined whether the quality of the transmission channel between the UE and a network node of the first mobile network is below a threshold (e.g., based on measured or derived metrics). In response to the quality being below a threshold, the UE can tune to different frequencies of other communications networks that are part of a federation that includes the first mobile network (e.g., federated by way of an agreement). The network nodes of these other communication networks can be operable to broadcast performance parameter(s) and cost (cost information, price, pricing information) for connecting to the network nodes. The broadcast performance parameter(s) and cost information can be received by UEs of all the federated communications network operators. In response to an evaluation of the received broadcast parameters and costs, the UE can determine whether to connect to the other networks via the other network nodes (e.g., transceiver of a network node, wireless access point, Wi-Fi access point, etc.) of a particular communications network operator in the federation. For example, a UE on the AT&T network can determine that a metric (e.g., a signal-to-noise ratio, signal-to-noise plus interference ratio, for example) is below a threshold. It can then tune to other frequencies that other federated carriers are operating in (e.g., Verizon, T-Mobile, etc.) within the same operating geography as the UE. The Verizon network node, T-Mobile network node, etc. broadcasts performance parameter(s) and the cost for connecting to their networks. The UE on the AT&T network can then evaluate the parameters and costs broadcast by the Verizon network node, the T-Mobile network node, etc., and in response to an evaluation of the broadcast parameters and costs, connect to Verizon's mobile network via the Verizon network node, for example. In example embodiments, a "reverse auction" process can also be employed wherein any mobile device (observing the broadcast pricing) can communicate with multiple, local, federated radios with an offer price for data services to which any transceiver can respond to the effect that it accepts the offer. Additionally, in accordance with example embodiments, the direct handoffs between federated network nodes can be enabled by the mobile device sending an encrypted value to the new transceiver which it can decrypt to validate/permit the handoff.

If more network node transceivers from more mobile network operators were available as a federation, then network capacity across the board can increase dramatically without adding a single base station transceiver. Since delivering capacity is an extremely big cost for proving wireless service, a large component to capacity delivery is to use the closest base station, not necessarily "your own" closest base station. This increase would be exclusively due to improvement in S/(I+n). It would be reasonable to conclude that if in the United States, AT&T, Verizon, T-Mobile, and Sprint were able to use each other's base station transceivers (e.g., use the closest one) then all four networks would likely see capacity increases of 50% or better on average without building new base stations. Then consider that any access point can do the same leading to probably 100-200% capacity increases. The S/(I+n) for a mobile connected to a Wi-Fi transceiver twenty feet away can easily be 1000 times higher than for a base station 2 miles away.

Examples of wireless and fixed networks will now be described to provide context and also illustrate some ways in which a UE can access a communication network wirelessly, followed by example embodiments of the present application.

FIG. 1 illustrates a diagram of an example wireless communication environment. In example embodiments (also referred to as non-limiting embodiments), one or more user equipment (UE) $102_{1-N}$, whereby "N" represents some number (also referred to herein by example and in the singular as UE 102, and also in the plural as UEs 102) can communicate with one another via one or more network nodes $104_{1-N}$, whereby "N" represents some number (also referred to herein as network node 104 in the singular, and also in the plural as network nodes 104) of the mobile network 106 (mobile can also be referred to as cellular), which can comprise one or more mobile networks typically operated by communication service providers (e.g., MNOs). The dashed arrow lines from the network nodes $104_{1-N}$ to the UEs $102_{1-N}$ represent downlink (DL) communications and the solid arrow lines from the UEs $102_{1-N}$ to the network nodes $104_{1-N}$ represent uplink (UL) communications.

UE 102 can comprise, for example, any type of device that can communicate with mobile network 106, as well as other networks (e.g., fixed networks, Wi-Fi networks, etc., see below). Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a machine-type communication (MTC) device, a C-V2X client device associated with (e.g., integrated with, inside of, embedded in, mounted upon, etc.) a vehicle (e.g., motor vehicle, such as a car, van, bus, truck, etc.), and the like. UE 102 can also comprise internet of things (IoT) and industrial internet of things (IIoT) devices that can communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, mobile network 106 can be or can include a large-scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, mobile network 106 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 (e.g., network node 104 device) of the mobile network 106. Network node 104 can have a cabinet and other protected enclosures, an antenna mast, and multiple antennas for performing various transmission operations (e.g., MIMO operations), and one or more transceivers for transmitting communications to and receiving communications from UEs and other network devices. Each network node 104 can serve several cells, also called sectors, depending on the configuration and type of antenna. Network node 104 can also comprise multi-standard radio (MSR) radio network node devices. Network node 104 can comprise: base station (BS) devices (e.g., a base station controller (BSC), a base transceiver station (BTS)), mobile stations, access point (AP) devices, radio access network (RAN) devices, an MSR BS, a Citizens Broadband Radio Service Device (CBSD), a network controller (e.g., a radio network controller (RNC)), a relay device, a transmission point (TP), a transmission/receive point (TRP), a transmission node, a remote radio unit (RRU), a remote radio head (RRH), nodes in distributed antenna system (DAS), NodeB devices (e.g., an evolved NodeB device, or eNodeB device, as referred to in LTE terminology; gNodeB device, as referred to in 5G terminology), and the like.

In example embodiments described below, several network nodes can operate in the same geographic coverage area and may be owned and operated by different mobile network operators (MNOs). In example embodiments, various network devices can also be coupled to, or connected to, the network node. It can be, for example, devices that are part of cellular data core of the MNO, for example a radio access network (RAN) controller device (e.g., mobility management entity (MME) device in LTE terminology, access and mobility management function (AMF) mobile entity device in 5G terminology, etc.), a gateway device, or some other networked computing device that resides in the MNO's network.

Figure 2:
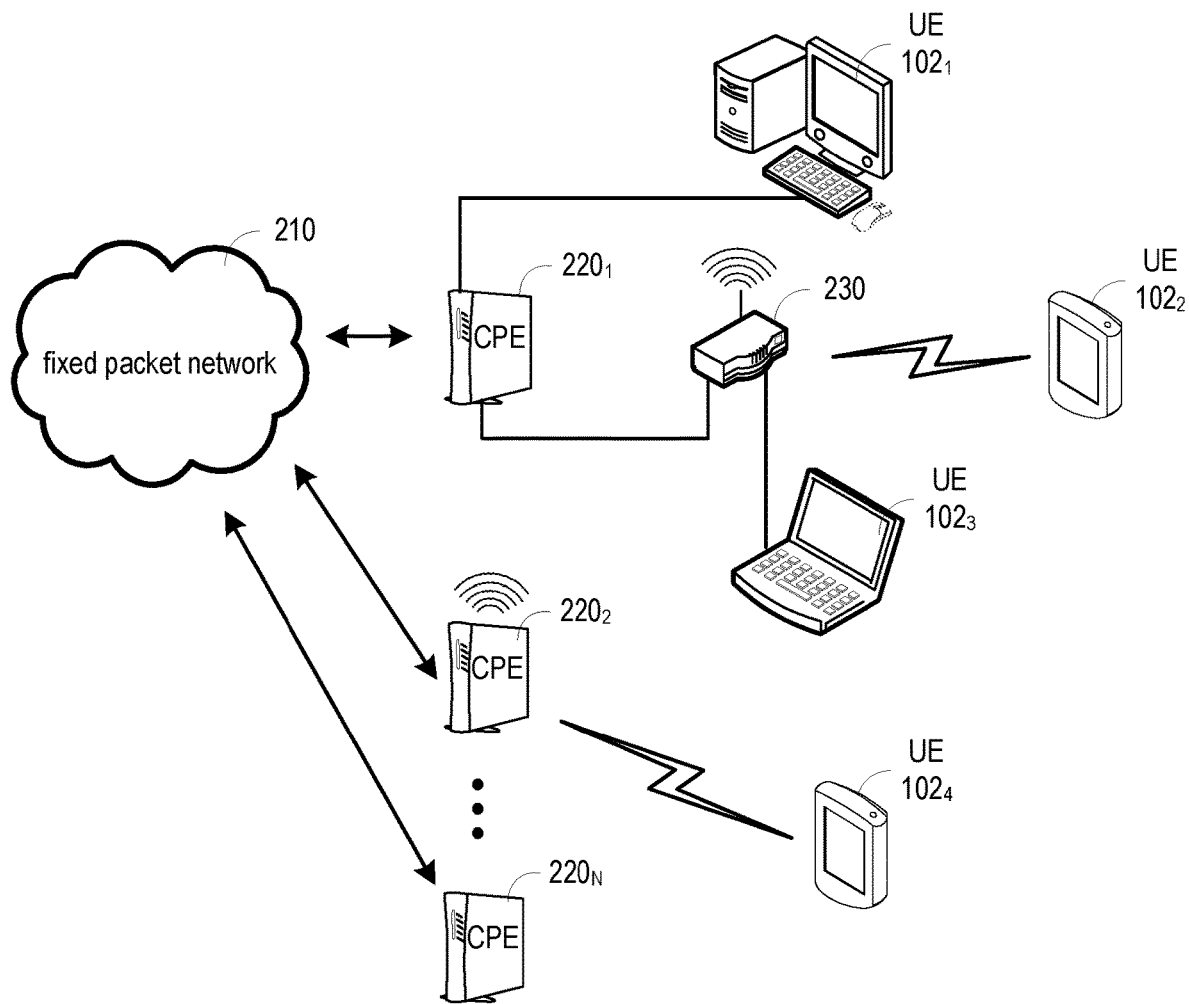
FIG. 2 illustrates an example of a fixed packet network comprising various customer premises equipment (CPE) and wireless access points, in accordance with various aspects and example embodiments of the present application.

FIG. 2 illustrates an example of a fixed packet network-based environment. The fixed packet network 210, which can be accessed by user equipment (e.g., UE $102_{1-N}$) via one or more customer premises equipment (CPE) $220_{1-N}$, whereby "N" represents some number (referred to herein as CPE 220 in the singular, and also in the plural as CPEs 220). One or more CPEs 220 can provide access to the fixed packet network 210. Fixed packet network 210 can be operable to use internet protocol (IP) to deliver video, voice (e.g., voice over IP (VoIP), and data packets.

In example embodiments, the fixed packet network 210 can comprise a cable television (CATV) network implementing the data over cable service interface specification (DOCSIS) and PacketCable standards. The fixed packet network 210 can comprise headend equipment such as a cable modem termination system (CMTS) device that transmits and receives communications from one or more CPEs (e.g., CPEs 220) through one or more hybrid fiber coaxial cable (HFC) networks. The CPEs 220, each of which has its own MAC address, can comprise cable modems (CMs) for modulating and demodulating signals to and from the cable network. CPEs 220 can also comprise a telephony modem (e.g., a modem embedded with a VoIP adapter), through which a telephone can connect and make voice calls. Examples of such CPE that support voice and data communications are also known as embedded multimedia terminal adapters (EMTAs), digital voice modems, voice data modems, voice and internet modems, and the like. CPEs 220 can also comprise gateway devices (also referred to as a residential gateway, home gateway, set top gateway) that can process video packets, voice packets, and data packets, and serve as a broadband connectivity point for various UEs 102 (e.g., video set-top boxes, computers, mobile devices, telephones, etc.).

Referring to FIG. 2, the fixed packet network 210 can also comprise networks using asynchronous transfer mode (ATM), digital subscriber line (DSL), asymmetric digital subscriber line (ADSL), and very high bit rate digital subscriber line (VDSL) technology. These networks have traditionally been provided by telephone companies (telcos). ATM and DSL/ADSL equipment can be located at an exchange or central office, and can include integrated DSL/ATM switches, multiplexers such as digital subscriber line access multiplexers (DSLAMS), and broadband remote access servers (B-RAS), all of which can contribute to the aggregation of communications from user equipment onto a high-capacity uplink (ATM or Gigabit Ethernet backhaul) to internet service providers (ISPs). Transmission media connecting the central office and user equipment can include both twisted pair and fiber. The CPEs 220 can comprise a DSL modem, DSL telephony modem, or DSL gateway device.

Referring to FIG. 2, in addition to data over cable and DSL based solutions as described above, the fixed packet network 210 can also be provided via WiMAX networks implementing the IEEE 802.16 family of wireless networking standards, or any combination of those packet switched networks described herein or known in the industry. With a WiMAX network, the one or more CPEs 220 can comprise WiMAX modems through which a UE (e.g., UE 102) can connect. As with its cable and DSL counterparts, the WiMAX CPE can also comprise a telephony modem and gateway device.

Still referring to FIG. 2, the fixed packet network 210 can also comprise one or more satellite networks, which can enable the exchange of voice, data, and video. In addition to television programming services, satellite networks, such as a DBS (Direct Broadcast Satellite) system, operated by DBS broadcast satellite providers (e.g., Dish Networks, DIRECTV, HughesNet), can be operable to enable high speed internet and voice services. A typical satellite broadband network can comprise a network operations center that interfaces with the Internet and transmits signals via satellite to a customer identity's premises. At the customer identity's premises, a satellite antenna (which can be mounted on a building associated with the customer identity, for example) can be operable to transmit and receive signals. With a satellite broadband network, the one or more CPEs 220 can comprise satellite modems (also referred to as satmodems), through which a UE (e.g., UE 102) can connect. The CPE 220 can also comprise satellite modems capable of processing voice (telephony satmodem), or a satellite gateway device.

Still referring to FIG. 2, the fixed packet network 210 can be a fiber internet network that employs optical networking (e.g., Verizon fiber optic service (FiOS)). The CPEs of such a network comprise optical network terminals (ONTs).

Still on FIG. 2, although the described packet-based broadband IP networks have been referred to as "fixed" because of the lack of range or mobility of the on-premises access point (e.g., CPE devices), these networks can still include the use of wireless technology. For example, wireless communications can be incorporated in the delivery infrastructure of the fixed packet network (such as satellite, radio transmission towers, microwave towers, and other wireless technology), and fixed packet networks can also be accessed via a local wireless network (which typically has limited range) such as a Wi-Fi network, as described further below.

Referring to FIG. 2, there can be several configurations in which CPEs can be operable to communicate with one or more UEs (e.g., UEs 102). The UEs 102 can have an appropriate wireline or wireless interface enabling communications with the fixed packet network 210 via the one or more CPEs 220. For example, the UE designated as UE $102_1$ can be connected to the CPE $220_1$ via a wired connection (e.g., an Ethernet interface, or a universal serial bus (USB) interface). The UE can be, for example a desktop (as shown), or a laptop computer having an Ethernet adapter (or USB port in some embodiments), or any other computing device having an Ethernet adapter, or USB port.

The CPE designated as CPE $220_1$ is also shown in FIG. 2 as being connected to a peripheral wireless local area network (WLAN) device (wireless router 230) via, e.g., a wireless connection (e.g., Ethernet). The wireless access point can be a wireless router that operates in accordance with the IEEE 802.11 family of standards, and can serve as an access point to the fixed packet network 210 for one or more UEs (e.g., the UE as designated as UE $102_2$ as shown in FIG. 2) can have a wireless adapter (e.g., a Wi-Fi adapter) for transmitting and receiving signals between the wireless router 230. The wireless router 230 can establish a WLAN (referred to by some as a subnet, or subnetwork), to which one or more UEs can connect. The wireless router 230 can also have a wireline interface for allowing UEs (e.g., UE $102_4$ depicts a laptop) to connect to the wireless router 230. For example, the wireless router 230 can have one or more Ethernet ports for UE $102_3$ to connect to the wireless router 230 via Ethernet cables.

Still referring to FIG. 2, in example embodiments, some CPEs 220 can have a wireless router module embedded within the CPE, instead of having a wireless router connected peripherally to the CPE. As shown in FIG. 2, the CPE designated as CPE $220_2$ can have embedded in the CPE device Wi-Fi routing functionality that operates in accordance with, for example, the IEEE 802.11 family of standards, and can serve as an access point to the fixed packet network 210 for one or more UEs that have a wireless adapter (e.g., a Wi-Fi adapter). As shown in FIG. 2, a mobile phone (e.g., the UE designated as UE $102_4$) can communicate wirelessly with the CPE device with Wi-Fi functionality.

Figure 3:
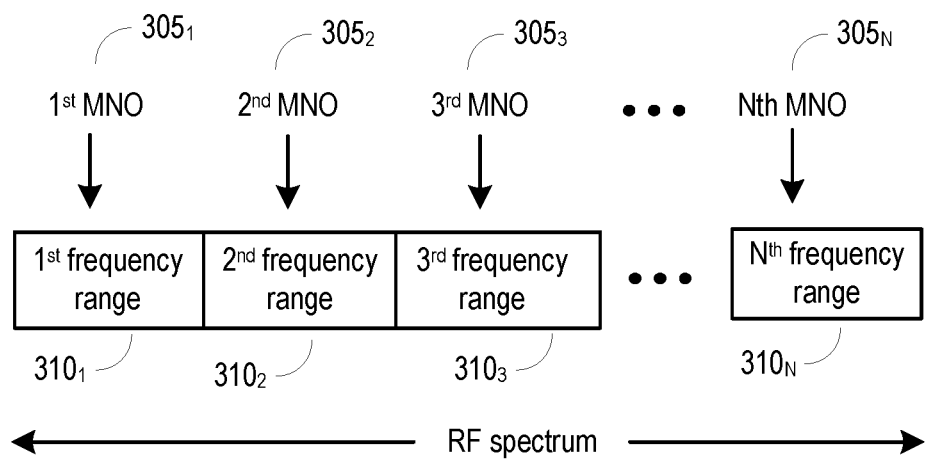
FIG. 3 illustrates an example in which mobile network operators (MNOs) operating in a region are each allocated a frequency band within the radio frequency (RF) spectrum, in accordance with various aspects and example embodiments of the present application.

Moving now to FIG. 3, as mentioned above, frequency bands (e.g., each band comprising a frequency range) within the RF spectrum are allocated to various organizations and entities, including MNOs. FIG. 3 provides an illustration of an example in which MNOs (also referred to as MNO entities) operating in a region, wherein the coverage area of each MNO's mobile network overlap, are each allocated a frequency band within the RF spectrum. As such, even within the same geographical region, MNOs can be allocated different frequencies within the RF spectrum, such that network nodes and UEs that are part of one MNO's network can operate on different frequencies in the same region as the network nodes and UEs of other MNOs. As illustrated in FIG. 3, a first MNO $305_1$ can be allocated a first frequency range $310_1$ of the RF spectrum, a second MNO $305_2$ can be allocated a second frequency range $310_2$, a third MNO $305_3$ can be allocated a third frequency range $310_3$, until an Nth MNO $305_N$ can be allocated an Nth frequency range $310_N$, whereby "N" represents some number. After allocation, each MNO can communicate with UEs registered on its network via the frequencies in the frequency range allocated to that MNO. For example, a network node (e.g., network node 10). This allocation allows each MNO to communicate with UEs in a geographic region on its own frequencies, without overlap (e.g., interference) with the other MNOs communicating with their respective UEs on other frequencies.

Even though this conventional granting process for spectrum allocation is simple and mature, it is becoming insufficient for addressing the rapid expansion of the wireless communications industry, especially considering the proliferation of wireless devices and services. MNOs are demanding more spectrum permissions that exceed the spectrum available at public auctions. This conventional approach is meeting its limits. Once spectrum has been allocated (e.g., auctioned), an MNO might need additional spectrum in an area, but it typically cannot use the radio resources allocated to another MNO entity, even when these radio resources of the other MNO entity are idle at some moments.

Having described some examples in which UEs can connect wirelessly with networks (e.g., via network nodes, wireless access points, Wi-Fi access points, etc.), and an example of allocation of frequencies of the RF spectrum to mobile networks, the present application now describes example embodiments in which a UE can connect to nodes of communications networks through which it is not subscribed.

Figure 4:
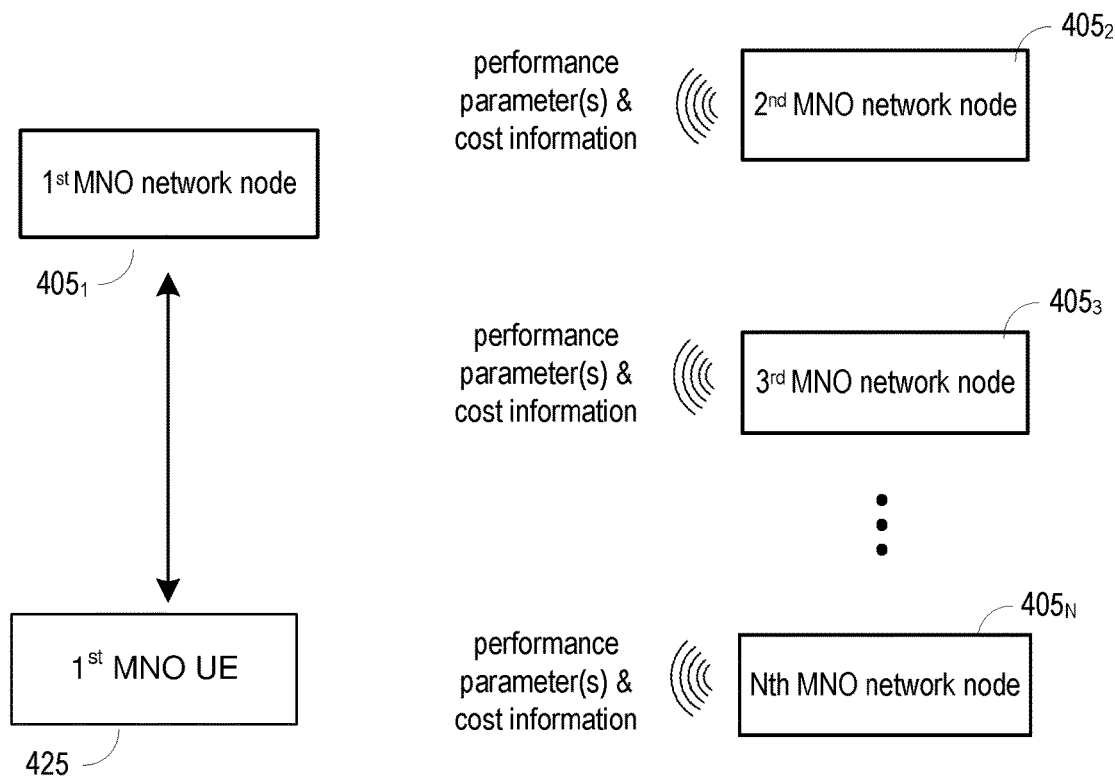
FIG. 4 illustrates an example depicting the broadcast of performance parameter(s) and cost information by network nodes, in accordance with various aspects and example embodiments of the present application.
Figure 4:
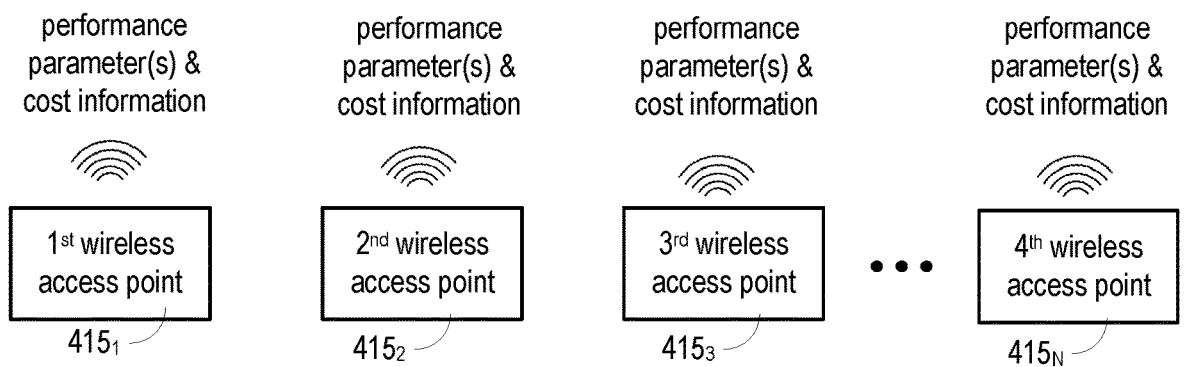

FIG. 4 shows blocks representative of communication network operators (e.g., $\text{MNO}_{1\text{-}N}$ operating mobile networks providing cellular service, or MSOs that operate cable networks that deliver broadband and high-speed internet, etc.) operating in the same geographic region, wherein the mobile network coverage area of the communication network wireless access nodes overlap. As illustrated in FIG. 4, there is shown as examples a first MNO network node $405_1$ owned or operated by a first MNO (e.g., first MNO $305_1$), a second MNO network node $405_2$ owned or operated by a second MNO (e.g., second MNO $305_2$), a third MNO network node $405_3$ owned or operated by a third MNO (e.g., third MNO $305_3$), up to an Nth MNO network node $405_N$ owned or operated by an Nth MNO (e.g., Nth MNO $305_N$), where "N" represents some number. The network nodes $405_{1\text{-}N}$ can be of the same type of devices as network nodes 104. An MNO network node can comprise one or more devices within an MNO's communication network. A network node (e.g., network node device) can comprise, for example, network node 104, or one or more network nodes 104.

Each of the MNO network nodes can communicate with one or more UEs registered on the respective MNO's network. An MNO network node can allocate frequencies from within the frequency range allocated to that MNO. As an example, first MNO network node $405_1$ can communicate with a UE registered with the MNO's network, referred to in FIG. 4 as first MNO UE 425, which can be the same type of device as UEs 102. The first MNO network node $405_1$ can communicate with the first MNO UE 425 on one or more frequencies within the first frequency range $310_1$, which, as explained with respect to FIG. 3 above, is the frequency range of the RF spectrum allocated to the first MNO $305_1$ (e.g., through an auction process).

Still on FIG. 4, in accordance with example embodiments of the present application, first MNO UE 425 can determine whether the quality of the transmission channel between the UE and its registered-to network node, first MNO network node $405_1$, is below a threshold, e.g., based on measured or derived metrics. A metric representative of the quality of transmitted signals received by the UE, can be determined and evaluated by the first MNO UE 425 to see if the threshold has been attained (e.g., met, fallen below, surpassed, reached, etc.). A metric might be, for example, a throughput, an error rate, a signal-to-noise ratio, a signal-to-noise plus interference ratio, channel quality information (CQI), or some other metric indicative of the strength of, or quality of, the signal or communication channel between first MNO UE 425 and the first MNO network node $405_1$, or indicative of the quality of the transmission conditions between the UE and the network node. In response to the quality being below a threshold, the first MNO UE 425 can tune to different frequencies of other communications networks that are part of a federation (e.g., federated by way of an agreement) of communication network providers (e.g., MNOs, MSOs). The federation can include, as examples, the first MNO $305_1$, the second MNO $305_2$, the third MNO $305_3$, etc.

Still on FIG. 4, In response to the metric being determined to have reached a threshold, the UE can scan a group of frequency bands, wherein each group of frequency bands (e.g., second frequency range $310_2$, third frequency range $310_3$, Nth frequency range $310_N$) are used by different MNO network nodes. In typical normal operations, a UE tunes to the frequencies in the frequency band allocated to its registered MNO (e.g., first MNO UE 425 would tune to first frequency range $310_1$). In example embodiments of the present application, however, the UE can be programmed to tune to all frequencies within the RF spectrum to receive the broadcast parameters from several federated MNO network nodes. The first MNO UE 425, tuning to a variety of frequencies (e.g., rapidly moving between the signals broadcast by the network nodes), can receive performance parameter(s) and cost information transmitted by the federated MNO network nodes. As shown in FIG. 4, the federated MNOs' network nodes (e.g., first MNO network node $405_1$, second MNO network node $405_2$, third MNO network node $405_3$, etc.) can be operable to broadcast parameter(s) and cost information that can be received by UEs of all federated communications network operators. The MNO network nodes can broadcast (e.g., via control signals) the parameters and the cost information on the frequencies their corresponding MNOs were allocated (e.g., second MNO network node $405_2$ can broadcast its parameter(s) and costs on frequencies in the second frequency range $310_2$).

The performance parameters can comprise, for example, resource availability (e.g., utilization of the frequency band by UEs, and whether enough spare capacity exists to assign more frequencies to more UEs), performance (e.g., efficiency, throughput, error rate, etc.). For instance, a transceiver may broadcast a series of numbers representing available megabits per second (Mbps) throughput representative of a rate of successful delivery of messages sent between the first network node device and the user equipment, megabytes per second (MBps) throughput, packet latency, uplink noise floor, packet retransmission rate, and cost per megabyte (MByte). Each of these may be a categorical representation (e.g., comprising scaled values) as opposed to a direct measure. In other words, available throughput may be presented on a scale of 0-10 as opposed to a megabit per second (Mbps) value.

In example embodiments, the cost information is the amount of money that it will cost for a UE to connect to that out-of-network federated network node. The cost information can be a function of, for example demand, or geography. For example, if a geographic area is crowded and a quality connection is more difficult to obtain for the UEs in that region, the high demand for a quality connection can be reflected in the cost information (e.g., it will cost more for the UE to connect to that network). The demand might also vary by time of day, or day of week, so the timing factor can also be reflected in the cost information. This encourages MNOs to place more network nodes in those areas where the carrier can command higher prices due to supply-demand economics.

After receiving the broadcast parameter(s) and cost information, the first MNO UE 425 can then evaluate the broadcast parameter(s) and cost information to determine to which network node to connect. In example embodiments, it employs an algorithm that considers downlink signal-to-noise ratio measured by the first MNO UE 425 on a common channel between it and the network node, broadcast uplink signal to noise ratio, performance, and cost. Just because the cost is lower doesn't necessarily imply the preferred connection because performance is also part of the consideration. As such, the first MNO UE 425 might determine to connect to network node having a higher cost/price, to obtain higher performance. After making a determination as to which network node provides the best connection from a performance-cost standpoint, the first MNO UE 425 can be operable to connect to the network node of one of the MNOs in the federation (e.g., perhaps second MNO network node $405_2$). Note that first MNO UE 425 would likely not connect with its own MNO network node (first MNO network node $405_1$) even though it is broadcasting parameter(s) and cost information as well, because the first MNO UE 425 had already determined that the communication channel between it and the first MNO network node $405_1$ did not have the quality that the first MNO UE 425 desired. However, another UE in the same geographic region that is subscribed or registered with another carrier (e.g., third MNO $305_3$) might connect with the first MNO network node $405_1$ because the connection between this other UE and the first MNO network node $405_1$ might be substantially better than the connection between this other UE and third MNO network node $405_3$.

FIG. 4 also depicts one or more wireless access point devices ($415_{1-N}$). Like the MNO network nodes, the wireless access point devices can be associated with different communications network operators (e.g., MNOs, MSOs, etc.). For example, $1^{st}$ wireless access point $415_1$ might provide access to a first MSO's fixed communication network, $2^{nd}$ wireless access point $415_2$ might provide access to a second MNO's fixed communication network, etc. The wireless access point devices 415 can comprise wireless routers enabling Wi-Fi access (e.g., wireless router 230), wireless access point devices 415 can also comprise CPEs having wireless router modules enabling Wi-Fi access. Similar to the network nodes, the wireless access point devices can also broadcast their performance parameter(s) and cost information for a UE to access its Wi-Fi connection and network (e.g., a fixed broadband communication network).

To describe an example, an AT&T UE (e.g., a mobile phone) on the AT&T network may evaluate the quality of the communications it is receiving from an AT&T network node. The AT&T UE might determine that a metric (e.g., signal-to-noise ratio, signal-to-noise plus interference ratio) related to the quality of the signal is below a threshold. Looking for other MNO network nodes to connect with, the UE can then tune to other frequencies that other federated carriers are using (e.g., Verizon, T-Mobile, etc.) within the same overlapping geography as the AT&T UE. The Verizon network node, T-Mobile network node, etc. each broadcasts performance parameter(s) and the cost information for connecting to their networks. The UE on the AT&T network can then evaluate the performance parameter(s) and cost information broadcast by the Verizon network node, the T-Mobile network node, etc., and in response to an evaluation of the broadcast parameter(s) and costs, the AT&T UE can connect to Verizon's mobile network via the Verizon network node. Also as mentioned above, the AT&T UE might also be nearby a Wi-Fi network that provides broadband access via a fixed broadband network. The Wi-Fi router associated with the Wi-Fi network (e.g., wireless router 230) can also be operable to broadcast performance parameters and cost information for the AT&T UE to consider. If the AT&T UE has Wi-Fi calling enabled, it can use the Wi-Fi access to make calls, and as such, can consider this connection as a potential option.

Figure 5:
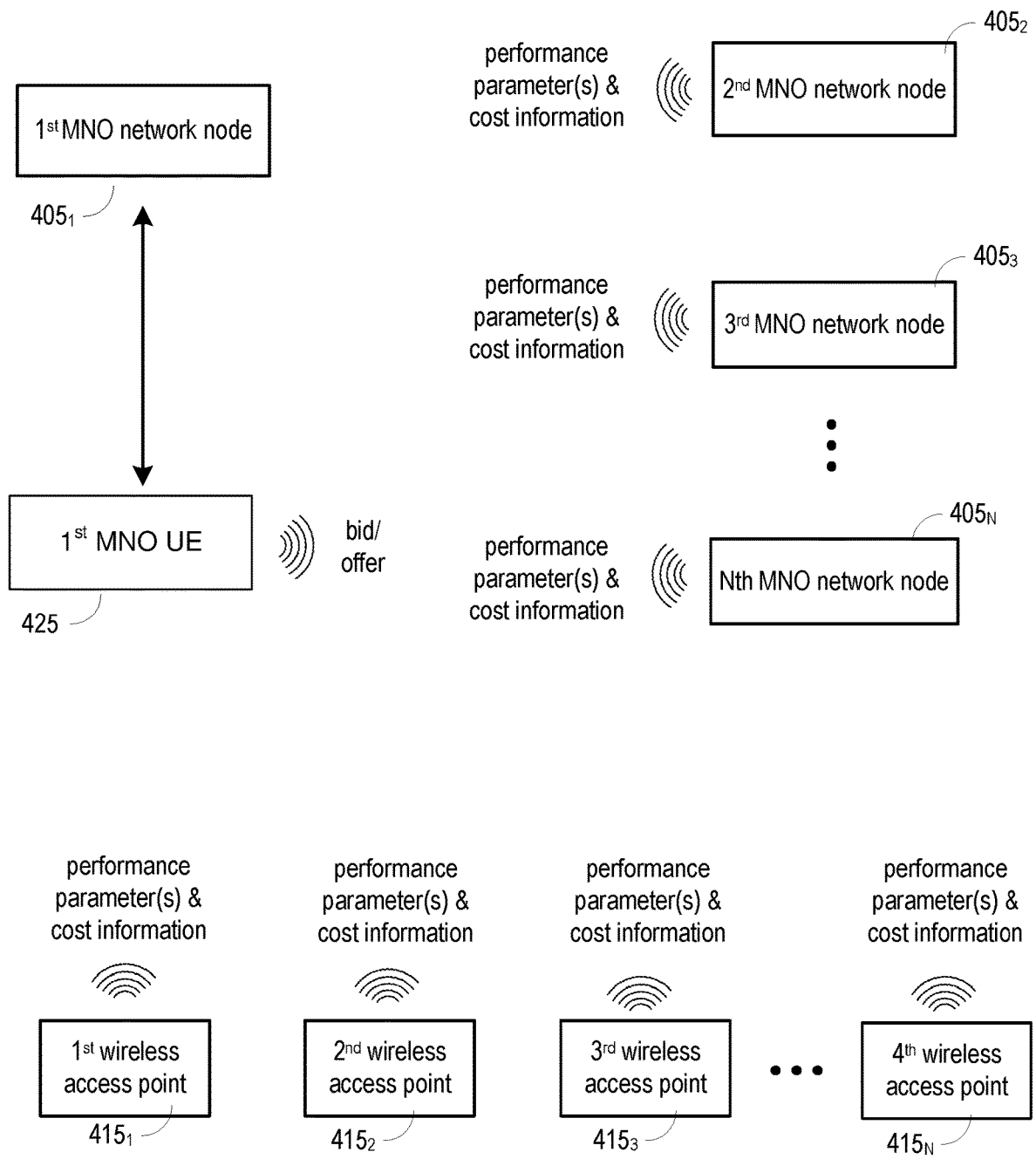
FIG. 5 illustrates an example depicting the transmission of an offer/bid in response to receipt of broadcasted performance parameter(s) and cost information, in accordance with various aspects and example embodiments of the present application.

Moving on to FIG. 5, in example embodiments in accordance with the present application, a "reverse auction" process can be used that enables any UE observing the broadcast cost information as described in FIG. 4 to communicate with multiple, local, federated network nodes (e.g., MNO network nodes 405, wireless access point devices 415, etc.) with an offer price (or bid) for data services to which any network node may respond to the effect that it accepts the offer. For example, the UE might receive the broadcast cost information (e.g., in dollars per gigabyte (GB)) from three network nodes on different carrier networks, all federated. In example embodiments, a UE (e.g., first MNO UE 425 registered with the MNO affiliated with the first MNO network node $405_1$), can determine if it is more optimal to connect with another network (e.g., it is experiencing low S/N+I from its own, first MNO network node $405_1$). It can tune to different frequencies and receive performance parameter(s) and cost/pricing information from various network nodes affiliated with other MNOs and MSOs. The pricing to connect with some of the network nodes might be, as an example, $1/GB, $1.1/GB and $1.3/GB. The UE may "offer" $0.90/GB to the network nodes to see which ones accept the offer. In example embodiments, the UE can send a signal, which can be a broadcast signal (e.g., a broadcast control signal), via frequencies in each of the other MNO's respective allocated frequency ranges (e.g., second frequency range $310_2$, third frequency range $310_3$, nth frequency range $310_N$, etc.) comprising data frames that contain the offer amounts. If two of the network nodes (e.g., second MNO network node $405_2$, and third MNO network node $405_3$) accept the offer, then the UE can then re-offer to connect with each of those two nodes at $0.85/GB. If only one network node accepts that offer (e.g., second MNO network node $405_2$), then the UE can connect to that network node. If no network node accepts the $0.85/GB offer, then the UE can connect with the network node that accepted the $0.90/GB offer first. If the first offer of $0.90/GB was not accepted by any network node, then the UE can raise the reverse auction bid offer (e.g., to $0.95/GB). The UE can continue to escalate the offer amount, up to the point that it can just accept one of the network node's original broadcast offers.

Of note, just because the cost/price is low doesn't necessarily imply the preferred connection from a performance standpoint, because even though performance can be a part of the decision-making algorithm, price might over-ride a decision on the part of the UE if the difference in price savings outweighs the sacrifice in performance Additionally, similar to FIG. 4, each network node can use its own "supply and demand" algorithm. When network nodes are heavily loaded, the price goes up. If a UE offers too low a price, busy transceivers will not be willing to drop their price when they can service higher prices to other mobile devices. This dynamic, reverse auction functionality can be a very efficient method for matching pricing to product offers in terms of wireless access.

Figure 6:
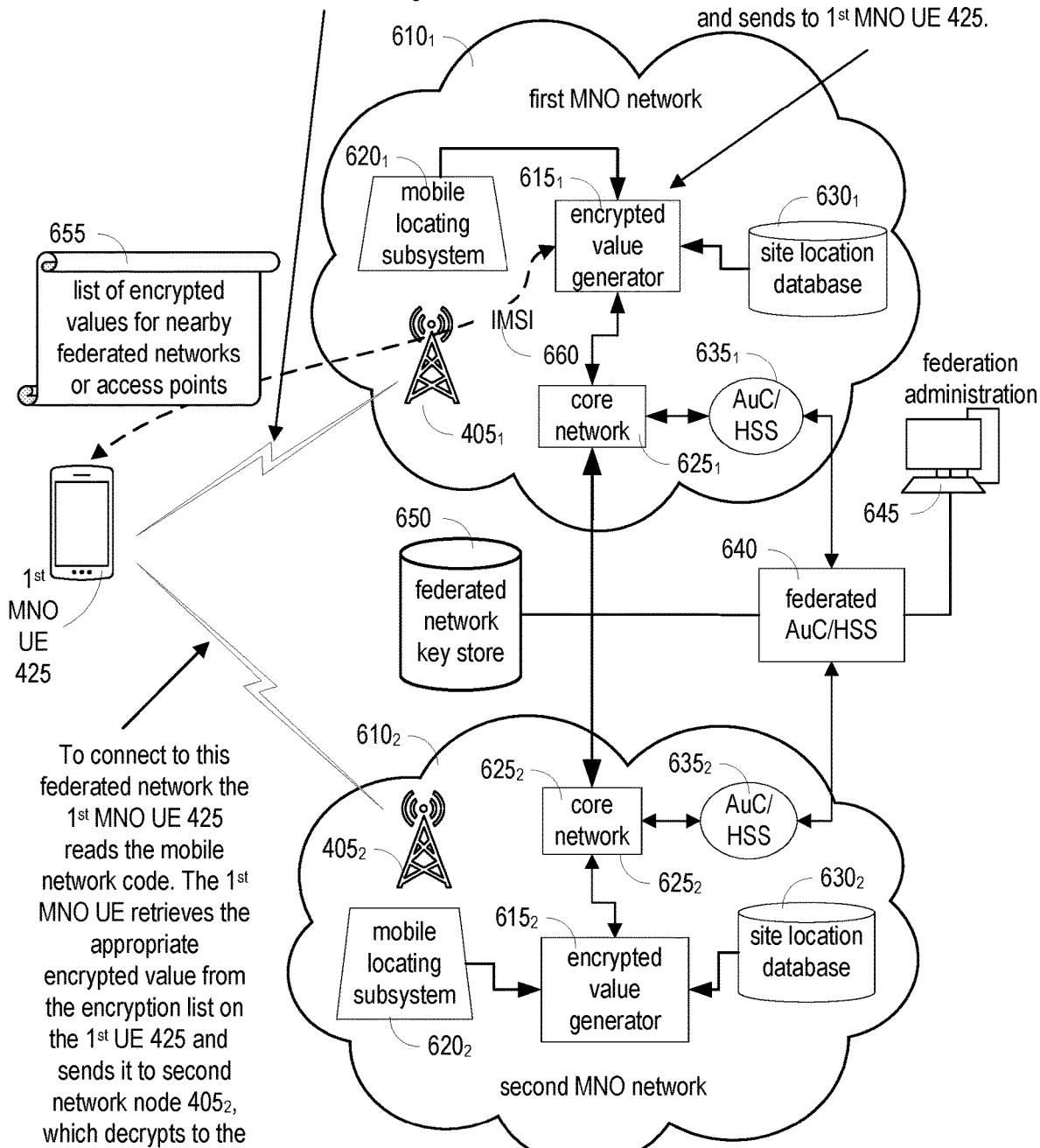
FIG. 6 illustrates an example of authentication when a UE connects to a federated network node, in accordance with various aspects and example embodiments of the present application.

Moving to FIG. 6, devices, systems, and operations to implement authentication will be discussed. For FIG. 6, the scenario is one in which a UE of a first network, first MNO UE 425, is first connected to the network node to which it is subscribed, first MNO network node $405_1$, and switches its connection to a network node affiliated with another network, second MNO network node $405_2$ affiliated with second MNO $305_2$. FIG. 6 shows a first MNO UE 425 connected to first a first MNO network $610_1$ (which can be of the type of mobile network described with respect to mobile network 106) comprising first MNO network node $405_1$, and first MNO encrypted value generator $615_1$. The first MNO encrypted value generator $615_1$ can be connected to a first MNO mobile locating subsystem $620_1$, a first MNO core network $625_1$, and first MNO site location database $630_1$. The first MNO core network $625_1$ can be connected to a first MNO AuC/HSS $635_1$ (e.g., authentication center (AuC), or home subscriber server (HSS)), which facilitates the authentication of UEs that attempt to access a mobile network. The first MNO AuC/HSS $635_1$ is connected to a federated AuC/HSS 640. The federated AuC/HSS 640 is connected to a federation administration device 645 (which can be a server, computing device, etc.) and a federated network key store 650. The second MNO network $610_2$ (which can be of the type of mobile network described with respect to mobile network 106) can have the same corresponding components and they are labeled accordingly.

The UEs of all federated mobile networks should be authenticated when attempting to connect to an communicate through any network node, including a network node affiliated with another MNO or communications network operator to which the owner of the UE is not subscribed. In example embodiments, a sharing mechanism is implemented between federated carriers and access point owners of information nominally held in the authentication center (AuC) or home subscriber server (HSS), which indicates the home network and account information such as data limits, roaming, texting, permitted services as a function of location or time of day, "Smart Limits" parental control, etc.

Movement of communications dynamically between nodes as a mobile device physically translates across geography can be handled using existing roaming handoff mechanisms, but for expeditiousness the example embodiments can implement a direct handoff between federated network nodes that is enabled by the UE sending an encrypted value to the new, federated network node that the new network node can directly decrypt to validate/permit the handoff.

In example embodiments, the encrypted value can be unique to the target network node's network, and can be pulled from a store of such values, indexed by each network node's broadcast network code (e.g., mobile network code (MNC)). For instance, when first MNO UE 425 connects to any network node of any federated network, first MNO UE 425 downloads a list of encrypted values 655, based on values from the federated AuC/HSS 640. The values from the AuC/HSS 640 can also be stored at a site location database (e.g., site location database $630_1$). Each of these values is created as a hash of a unique mobile device ID such as the international mobile subscriber identity IMSI 660, and a key value unique to each mobile network carrier. The encrypted values can be generated by first MNO encrypted value generator $615_1$. Therefore, as an example, first MNO UE 425 can obtain and store different encrypted values for AT&T, and Verizon if these carriers are federated, but not values for T-Mobile or Sprint since these carriers are not federated. When the first MNO UE 425 observes a T-Mobile network node transceiver broadcast (e.g., identifiable as the T-Mobile signal using its MNC), the first MNO UE 425 will not attempt to connect because the mobile device sees no values in its list for T-Mobile. Note that the mobile device may still be able to roam using current methods and not be part of the federation. Roaming and federation imply different business models and technical methods for handoff. When the first MNO UE 425 finds an encrypted value in the device list for a federated network node (e.g., second MNO network node $405_2$, which in this example can be Verizon), the first MNO UE 425 can request a connection to second MNO network node $405_2$, and it sends the encrypted value (e.g., obtained from the list of encrypted values 655 that it obtained). The second MNO network node $405_2$, upon receipt of the encrypted value from first MNO UE 425, decrypts the value using a key known to the second MNO network node (from the federated AuC/HSS 640, which can be stored in the federated network key store, but can also be stored locally at a site location database $630_2$) but unknown to the first MNO UE 425. This allows the second MNO network node $405_2$ to decrypt and recover the IMSI. The second MNO network node $405_2$ then sends a low-strength encryption key to the first MNO UE 425 along with a challenge value resulting from the second MNO network node $405_2$ using the same key to perform encryption of a portion of the IMSI (perhaps the last 6 digits). The first MNO UE 425 uses the same low-strength key to encrypt the same digits of the first MNO UE 425's IMSI and sends the result back to the second MNO network node $405_2$, which in turn decrypts the returned value, and validates the IMSI digits. When successful, the second MNO network node $405_2$ will accept a handoff request if resources permit it. The first MNO UE 425's full IMSI can then be used for sending billing information to the home network (in this case, first MNO $305_1$) or mobile billing account. The network key, unique to each mobile network, access point network, or access point, is rolled periodically (e.g., to decrease likelihood of hacking) and the first MNO UE 425, already connected to a wireless network, can request periodic updates to the encrypted values (not the keys) for network nodes available in its local area. For example, there is no need to share encrypted values for access points in Seattle with mobile devices currently in Miami. Coarse mobile location is known by the databased locations of the network node currently being used by a UE. Fraud is mitigated because fraudulent UEs cannot know the current network key for any network node. With rolling keys, fraudulent devices will less likely be able to crack a key before the key rolls. At any time, any network node can access the federated AuC/HSS to discover the account privileges for a connected UE. Administration of the above described protocol can be performed via a computing device, e.g., federation administration device 645.

The proposed architecture can lend itself to rapid relocation of mobile device registration between carrier networks. Paging for the purposes of call or data delivery to a mobile device requires consistent updates of the home network AuC/HSS/HLR. In example embodiments, a UE ID can be kept in a visitor location register for a prescribed duration even after the UE hands off to another carrier network. This would greatly reduce the need to verify the mobile identify with either local or federated AuC/HSS nodes when UEs are translocating back and forth between carrier mobile networks.

In each of the example operations described above, and below in FIGS. 7-10, steps, blocks, features, or aspects can be substituted or combined with other steps, blocks, features, or aspects, unless context warrants that such combinations or substitutions are not possible. Further, if a step, block, feature, or aspect is not described with respect to example operations, this does not mean that the feature, step, or aspect is incompatible or impossible with respect to those example operations. As such, the example operations of the present application described above and below are not necessarily limited to the steps, features, or aspects that are described with respect to those example operations.

Figure 7:
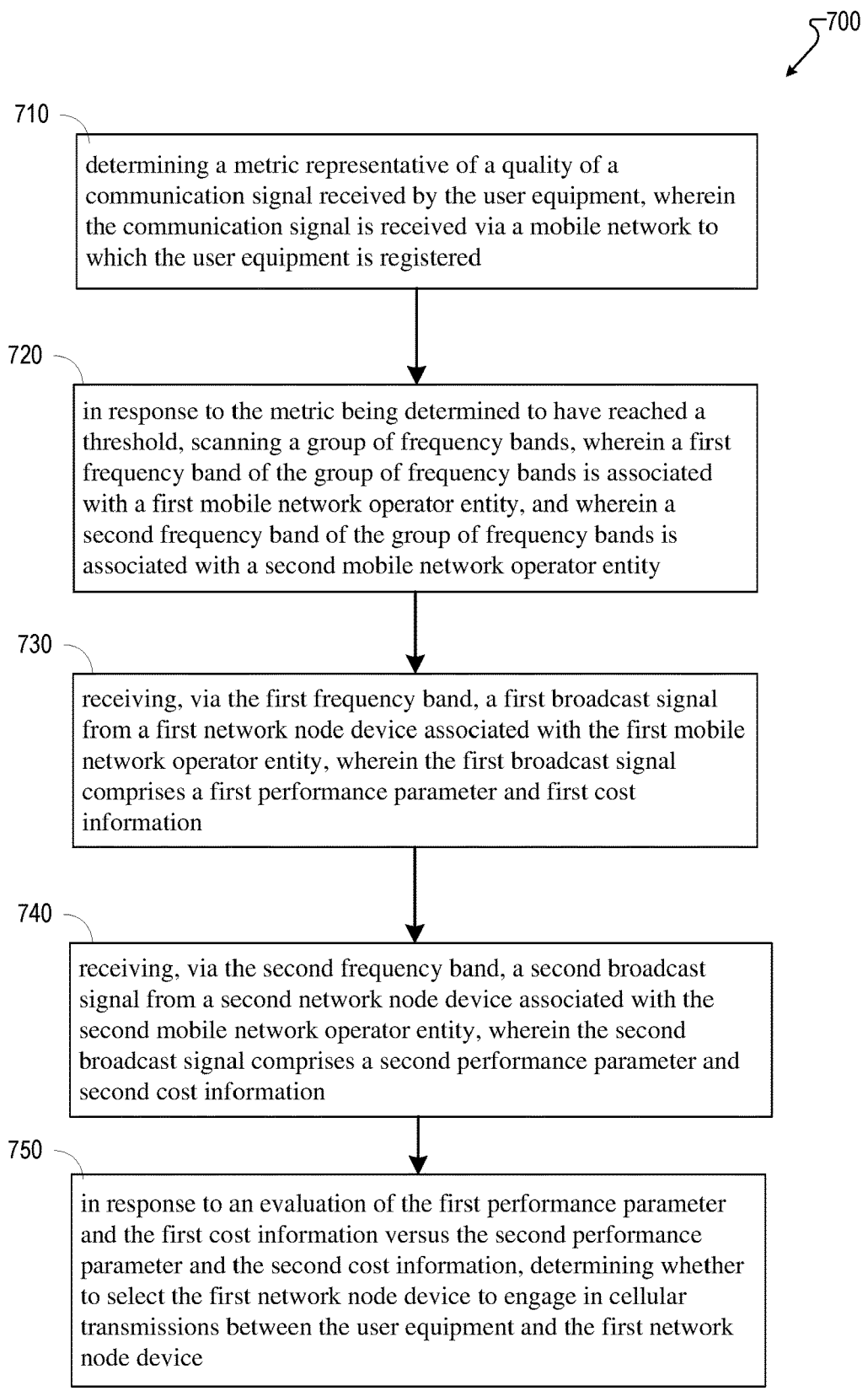
FIG. 7 illustrates a flowchart of example operations that can be performed by a UE related to connecting with a federated network node, in accordance with various aspects and example embodiments of the present application.

FIG. 7 illustrates example operations that can be performed by a UE (e.g., first MNO UE 425), in accordance with example embodiments of the present application. The UE can comprise a processor and a memory that stores executable instructions that, when executed by the processor, facilitate performance of example operations 700.

The example operations 700 can begin at block 710, determining a metric representative of a quality of a communication signal received by the user equipment, wherein the communication signal is received via a mobile network to which the user equipment is registered (e.g., first MNO network $610_1$ operated by first mobile network operator entity (first MNO $305_1$)). The metric can relate to a signal-to-noise ratio. The metric can also relate to a signal-to-noise plus interference ratio. The metric can also relate to an error rate. The metric can also relate to a throughput.

The example operations 700 can further comprise, at block 720, in response to the metric being determined to have reached a threshold (e.g., reached a certain point, has gone below a certain point, etc.), scanning a group of frequency bands (e.g., second frequency range $310_2$, third frequency range $310_3$, Nth frequency range $310_N$, etc.), wherein a first frequency band (e.g., second frequency range $310_2$) of the group of frequency bands is associated with a first mobile network operator entity (e.g., second MNO $305_2$), and wherein a second frequency band (e.g., third frequency range $310_3$) of the group of frequency bands is associated with a second mobile network operator entity (e.g., third MNO $305_3$).

The example operations 700 at block 730 can further comprise receiving, via the first frequency band, a first broadcast signal (e.g., a control signal) from a first network node device associated with the first mobile network operator entity (e.g., second MNO network node $405_2$), wherein the first broadcast signal comprises a first performance parameter and first cost information. The first performance parameter can comprise a throughput representative of a rate of successful delivery of messages sent between the first network node device and the user equipment. The first performance parameter can comprise a throughput representative of a packet latency. The first performance parameter can relate to an availability (e.g., resource availability) of the first frequency band for use by the user equipment, wherein the availability can be based on a utilization of the first frequency band by user equipment devices. The first performance parameter can relate to an uplink transmission noise floor. The first performance parameter can relate to a packet transmission rate. The first performance parameter can be on a categorical representation comprising scaled values (e.g., 1-10). The first cost information can be reflective of the current bandwidth demand by user equipment devices for the first frequency band.

The example operations 700 at block 740 can further comprise receiving, via the second frequency band (e.g., third frequency range $310_3$), a second broadcast signal (e.g., a control signal) from a second network node device associated with the second mobile network operator entity (e.g., third MNO network node $405_3$), wherein the second broadcast signal comprises a second performance parameter and second cost information. The second performance parameter can comprise a throughput representative of a rate of successful delivery of messages sent between the second network node device and the user equipment. The second performance parameter can comprise a throughput representative of a packet latency. The second performance parameter can relate to an availability (e.g., resource availability) of the second frequency band for use by the user equipment, wherein the availability can be based on a utilization of the second frequency band by user equipment devices. The second performance parameter can relate to an uplink transmission noise floor. The second performance parameter can relate to a packet transmission rate. The second performance parameter can be on a categorical representation comprising scaled values (e.g., 1-10). The first cost information can be reflective of a current bandwidth demand by user equipment devices for the second frequency band.

At block 750, the example operations 700 can further comprise, in response to an evaluation of the first performance parameter and the first cost information versus the second performance parameter and the second cost information, determining whether to select the first network node device to engage in cellular transmissions between the user equipment and the first network node device.

The operations can further comprise, in response to the determining whether to select the first network node device, selecting the first network node device to engage in the cellular transmissions.

Figure 8:
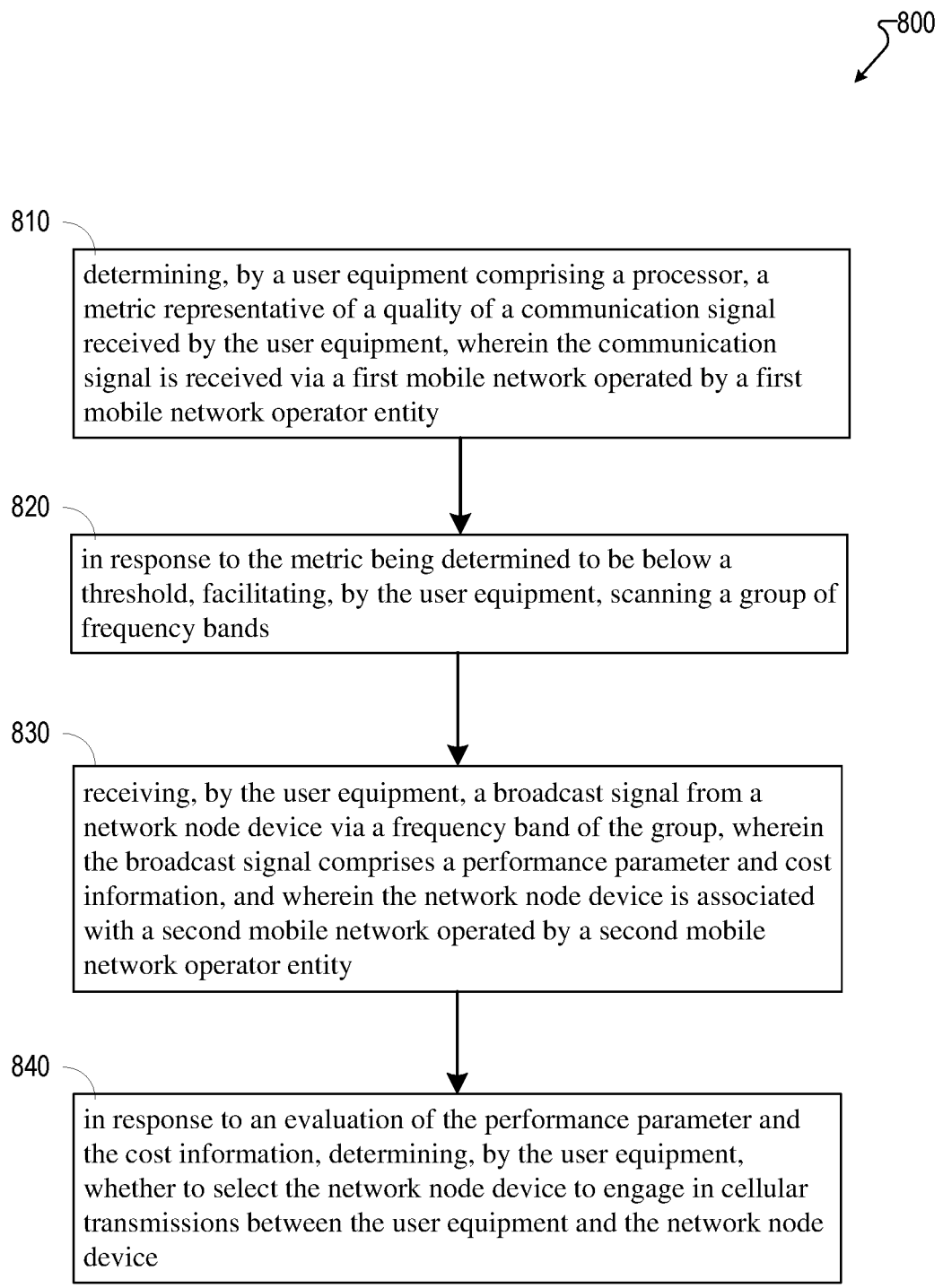
FIG. 8 illustrates another flowchart of example operations that can be performed by a UE related to connecting with a federated network node, in accordance with various aspects and example embodiments of the present application.

FIG. 8 illustrates another flow diagram of a method that can be performed, for example, by a UE (e.g., first MNO UE 425), in accordance with example embodiments of the present application. The UE can comprise a processor and a memory that stores executable instructions that, when executed by the processor, facilitate performance of example operations 800.

The example operations 800 at block 810 can comprise determining, by a user equipment comprising a processor, a metric representative of a quality of a communication signal received by the user equipment, wherein the communication signal is received via a first mobile network (e.g., 610$_1$) operated by a first mobile network operator entity (e.g., first MNO 305$_1$). The metric can relate to a signal-to-noise ratio. The metric can also relate to a signal-to-noise plus interference ratio. The metric can also relate to an error rate. The metric can also relate to a throughput.

At block 820, the example operations 800 can comprise, in response to the metric being determined to be below a threshold (which can also include reaching a threshold), facilitating scanning a group of frequency bands (e.g., second frequency range 310$_2$, third frequency range 310$_3$, Nth frequency range 310$_N$, etc.).

The example operations can comprise, at 830, receiving a broadcast signal (e.g., a control signal) from a network node device via a frequency band (second frequency range 310$_2$) of the group of frequency bands, wherein the broadcast signal comprises a performance parameter and cost information, and wherein the network node device (e.g., second MNO network node 405$_2$) is associated with a second mobile network (e.g., second MNO network 610$_2$) operated by a second mobile network operator entity (second MNO 305$_2$).

The performance parameter can comprise a throughput representative of a rate of successful delivery of messages sent between the first network node device and the user equipment. The performance parameter can comprise a throughput representative of a packet latency. The performance parameter can relate to a resource availability (e.g., how much spare capacity is in the frequency band that can be allocated). The performance parameter can relate to an uplink transmission noise floor. The performance parameter can relate to a packet transmission rate. The performance parameter can be on a categorical representation comprising scaled values (e.g., 1-10). The cost information can be reflective of a current bandwidth demand by user equipment devices for the frequency band.

At block 840, the example operations 800 can comprise, in response to an evaluation of the performance parameter and the cost information, determining whether to select the network node device to engage in cellular transmissions between the user equipment and the network node device.

The example operations 800 can further comprise selecting the network node device to engage in the cellular transmissions.

The example operations 800 can further comprise transmitting an encrypted value to the network node device, wherein the encrypted value is derived from a user equipment identifier (e.g., IMSI) and a mobile network indicator (e.g., MNC) associated with the second mobile network, and wherein the mobile network indicator denotes that the second mobile network operated by a second mobile network operator entity is federated with the first mobile network operated by the first mobile network operator entity.

The example operations 800 can further comprise receiving an encryption key from the network node device, and using the encryption key to encrypt digits corresponding to the user equipment identifier.

Figure 9:
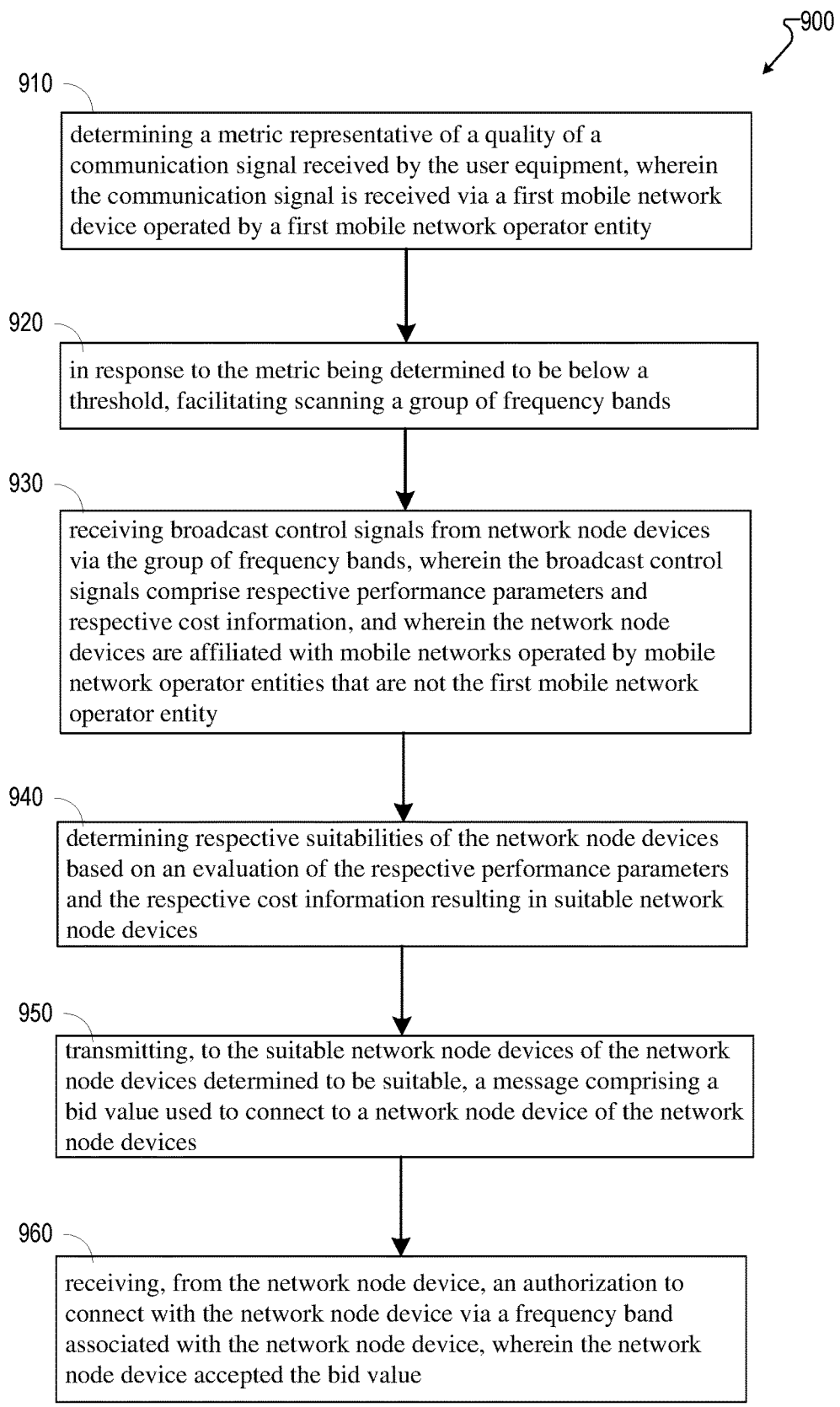
FIG. 9 illustrates another flowchart of example operations that can be performed by a UE related to connecting with a federated network node, in accordance with various aspects and example embodiments of the present application.

FIG. 9 illustrates another flow diagram of a method that can be performed, for example, by a UE (e.g., first MNO UE 425), in accordance with example embodiments of the present application. The UE can comprise a processor and a memory that stores executable instructions that, when executed by the processor, facilitate performance of example operations 900.

The example operations 900 at block 910 can comprise determining a metric representative of a quality of a communication signal received by the user equipment, wherein the communication signal is received via a first mobile network device (e.g., first MNO network node 405$_1$) operated by a first mobile network operator entity (e.g., first MNO 305$_1$). The communication signal can be transmitted via a first frequency in a frequency range (e.g., first frequency range 310$_1$) allocated for use by the first mobile network operator entity. The metric can relate to a signal-to-noise ratio. The metric can also relate to a signal-to-noise plus interference ratio. The metric can also relate to an error rate. The metric can also relate to a throughput.

At block 920, the example operations 900 can further comprise, in response to the metric being determined to be below a threshold (e.g., signal-to-noise ratio becomes lower than a certain level, or reaches a certain level), facilitating scanning a group of frequency bands (e.g., second frequency range 310$_2$, third frequency range 313$_3$, Nth frequency range 310$_N$, etc.).

The example operations 900 can, at block 930, further comprise receiving broadcast signals (which can be control signals) from network node devices (e.g., second MNO network node 405$_2$, third MNO network node 405$_3$, Nth MNO network node 405$_N$) via the group of frequency bands, wherein the broadcast signals comprise respective performance parameters and respective cost information (e.g., cost of the UE to connect to one of the network node devices to connect), and wherein the network node devices are affiliated with mobile networks operated by mobile network operator entities that are not the first mobile network operator entity. The respective performance parameters can relate to resource availability (e.g., how much spare capacity is present). The respective performance parameters can relate to an uplink transmission noise floor. The respective performance parameters can relate to a packet transmission rate.

The respective performance parameters can be on a categorical representation comprising scaled values (e.g., 1-10). The respective cost information can be reflective of a current bandwidth demand by user equipment devices for the frequency band.

The example operations 900 can further comprise, at block 940, determining respective suitabilities of the network node devices based on an evaluation of the respective performance parameters and the respective cost information resulting in suitable network node devices.

At block 950, the example operations 900 can further comprise transmitting, to the suitable network node devices of the network node devices determined to be suitable, a message comprising a bid value used to connect to a network node device of the network node devices.

The example operations 900 can, at block 960, further comprise receiving, from the network node device, an authorization to connect with the network node device via a frequency band associated with the network node device, wherein the network node device accepted the bid value.

The example operations 900 can further comprise connecting to the network node device.

The example operations 900 can further comprise transmitting an encrypted value to the network node device, wherein the encrypted value is derived from a user equipment identifier and a mobile network code associated with the network node device.

The example operations 900 can further comprise receiving an encryption key from the network node device, and using the encryption key to encrypt digits corresponding to the user equipment identifier.

Figure 10:
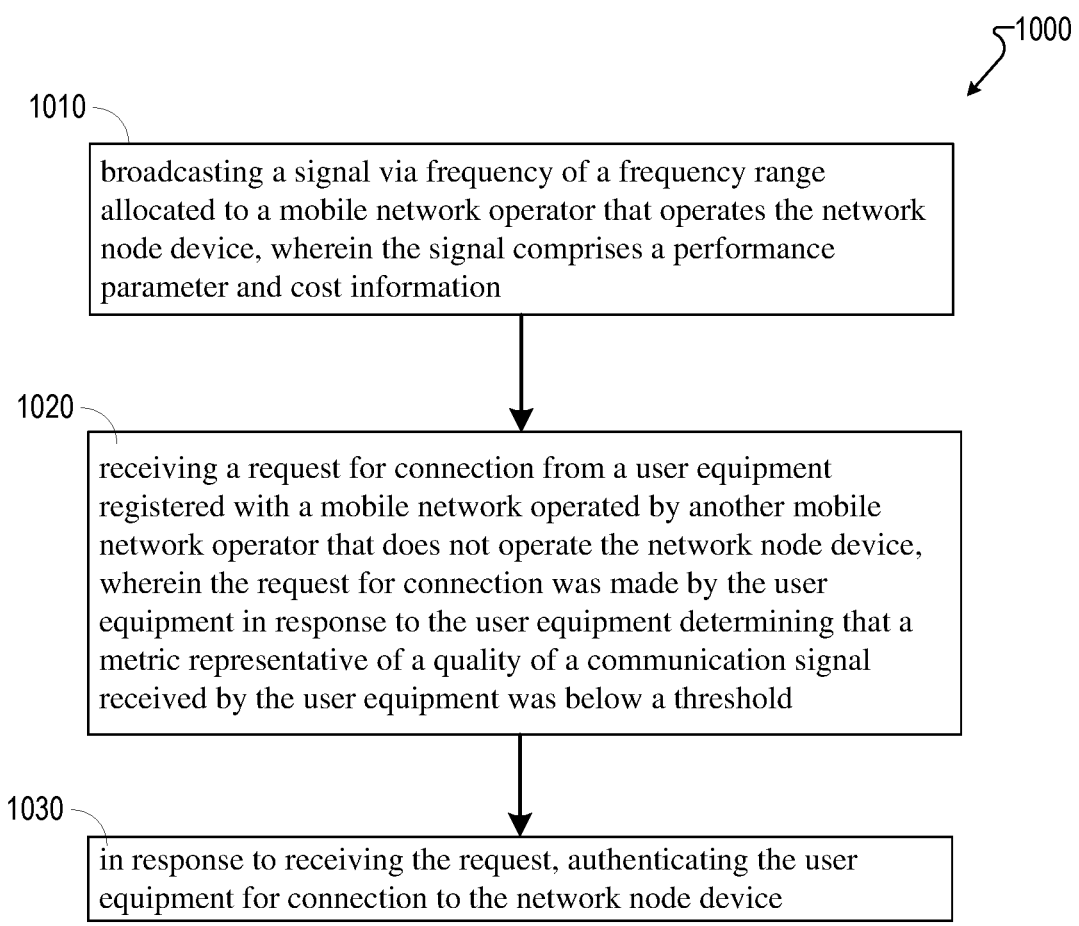
FIG. 10 illustrates a flowchart of example operations that can be performed by a federated network node related to a UE's connection with the federated node, in accordance with various aspects and example embodiments of the present application.

FIG. 10 illustrates another flow diagram of a method that can be performed, for example, by a network node device (e.g., second MNO network node $405_2$), in accordance with example embodiments of the present application. The network node device can comprise a transceiver, and a processor and a memory that stores executable instructions that, when executed by the processor, facilitate performance of example operations 1000.

The example operations 1000 can at block 1010 comprise, broadcasting a signal (e.g., a control signal) via frequency of a frequency range (e.g., second frequency range $310_2$) allocated to a mobile network operator (second MNO $305_2$) that operates the network node device, wherein the signal comprises a performance parameter and cost information. The performance parameter can relate to resource availability (e.g., how much spare capacity is present). The performance parameter can relate to an uplink transmission noise floor. The performance parameter can relate to a packet transmission rate. The performance parameter can be on a categorical representation comprising scaled values (e.g., 1-10). The cost information can reflect a price for connecting to the network node device. The cost information can also reflect a current bandwidth demand by user equipment devices for the frequency range.

The example operations 1000 can at block 1020 further comprise receiving a request for connection from a user equipment (e.g., first MNO UE 425) registered with a mobile network (e.g., first MNO network $610_1$) operated by another mobile network operator (e.g., first MNO $305_1$) that does not operate the network node device, wherein the request for connection was made by the user equipment in response to the user equipment determining that a metric representative of a quality of a communication signal received by the user equipment was below a threshold (or reaches a threshold). The metric can relate to a signal-to-noise ratio. The metric can also relate to a signal-to-noise plus interference ratio. The metric can also relate to an error rate. The metric can also relate to a throughput.

The example operations 1000 can, at block 1030, comprise, in response to receiving the request, authenticating the user equipment for connection to the network node device.

Figure 11:
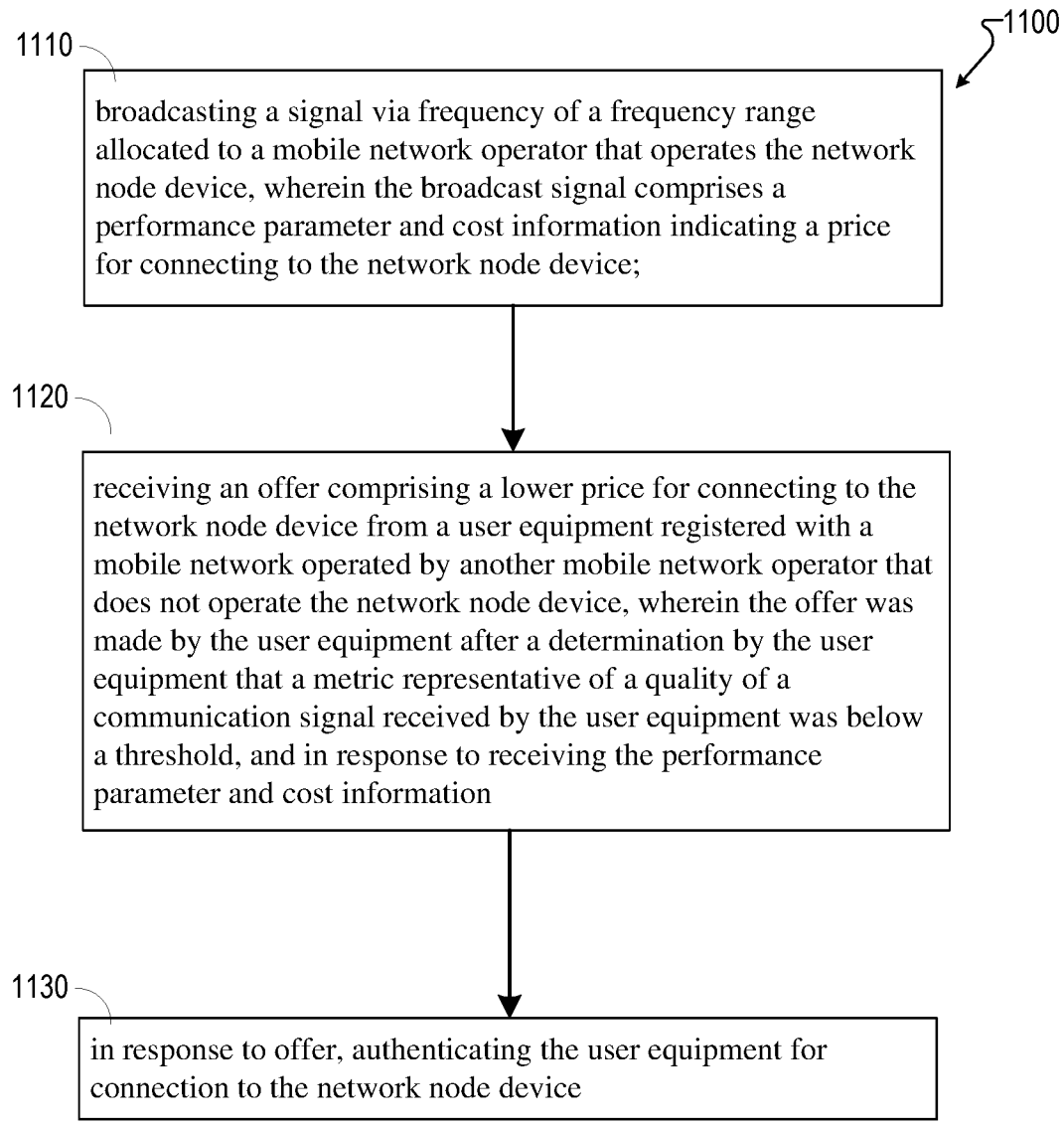
FIG. 11 illustrates another flowchart of example operations that can be performed by a federated network node related to a UE's connection with the federated node, in accordance with various aspects and example embodiments of the present application.

FIG. 11 illustrates another flow diagram of a method that can be performed, for example, by a network node device (e.g., second MNO network node $405_2$), in accordance with example embodiments of the present application. The network node device can comprise a transceiver, and a processor and a memory that stores executable instructions that, when executed by the processor, facilitate performance of example operations 1100.

The operations 1100 can comprise, broadcasting a signal via frequency of a frequency range (e.g., second frequency range $310_2$) allocated to a mobile network operator (second MNO $305_2$) that operates the network node device, wherein the broadcast signal comprises a performance parameter and cost information indicating a price for connecting to the network node device. The performance parameter can relate to resource availability (e.g., how much spare capacity is present in the frequency range). The performance parameter can relate to an uplink transmission noise floor. The performance parameter can relate to a packet transmission rate. The performance parameter can be on a categorical representation comprising scaled values (e.g., 1-10). The cost information can also reflect a current bandwidth demand by user equipment devices for the frequency range.

At block 1120, the example operations 11000 can further comprise, receiving an offer comprising a lower price for connecting to the network node device from a user equipment a user equipment (e.g., first MNO UE 425) registered with a mobile network (e.g., first MNO network $610_1$) operated by another mobile network operator (e.g., first MNO $305_1$) that does not operate the network node device, wherein the offer was made by the user equipment after a determination by the user equipment that a metric representative of a quality of a communication signal received by the user equipment was below a threshold, and in response to receiving the performance parameter and cost information. The metric can relate to a signal-to-noise ratio. The metric can also relate to a signal-to-noise plus interference ratio. The metric can also relate to an error rate. The metric can also relate to a throughput.

The example operations at block 1130 can further comprise, in response to offer, authenticating the user equipment for connection to the network node device.

Figure 12:
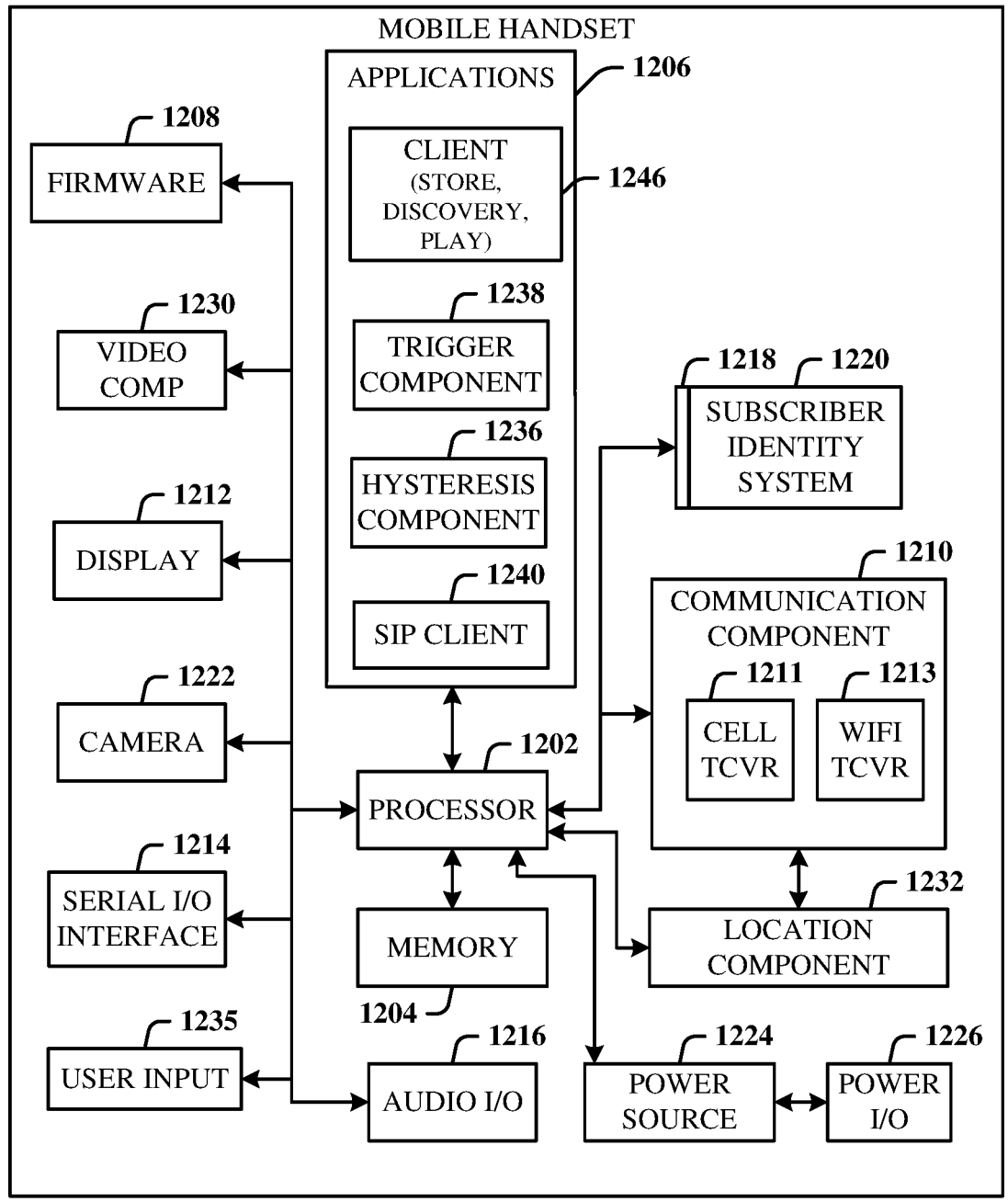
FIG. 12 illustrates an example block diagram of an example user equipment, in accordance with various aspects and example embodiments of the present application.

Referring now to FIG. 12, illustrated is a schematic block diagram of an example end-user device such as a user equipment (e.g., UE 102, first MNO UE 425) that can be a mobile device capable of connecting to a network in accordance with some embodiments described herein. One or more of the components as illustrated in FIG. 12 can comprise the user equipment, and although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The mobile handset 1200 comprises a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the mobile handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMAX) for corresponding signal communications. The mobile handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The mobile handset 1200 comprises a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the mobile handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The mobile handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the mobile handset 1200, and updated by downloading data and software.

The mobile handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the mobile handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The mobile handset 1200 also comprises a power source 1224 in the form of batteries and/or an AC power subsystem, which power source 1224 can interface to an external power system or charging equipment (not shown) by a power 110 component 1226.

The mobile handset 1200 can also include a video component 1230 for processing video content received and, for recording and transmitting video content. For example, the video component 1230 can facilitate the generation, editing and sharing of video quotes. A location tracking component 1232 facilitates geographically locating the mobile handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the mobile handset 1200 to support SIP protocols and register the subscriber with the SIP registrar server. The applications 1206 can also include a client 1242 that provides at least the capability of discovery, play and store of multimedia content, for example, music.

The mobile handset 1200, as indicated above related to the communications component 1210, comprises an indoor network radio transceiver 1213 (e.g., Wi-Fi transceiver). This function supports the indoor radio link, such as IEEE 802.11, for a dual-mode GSM handset. The mobile handset 1200 can accommodate at least satellite radio services through a handset that can combine wireless voice and digital radio chipsets into a single handheld device.

Figure 13:
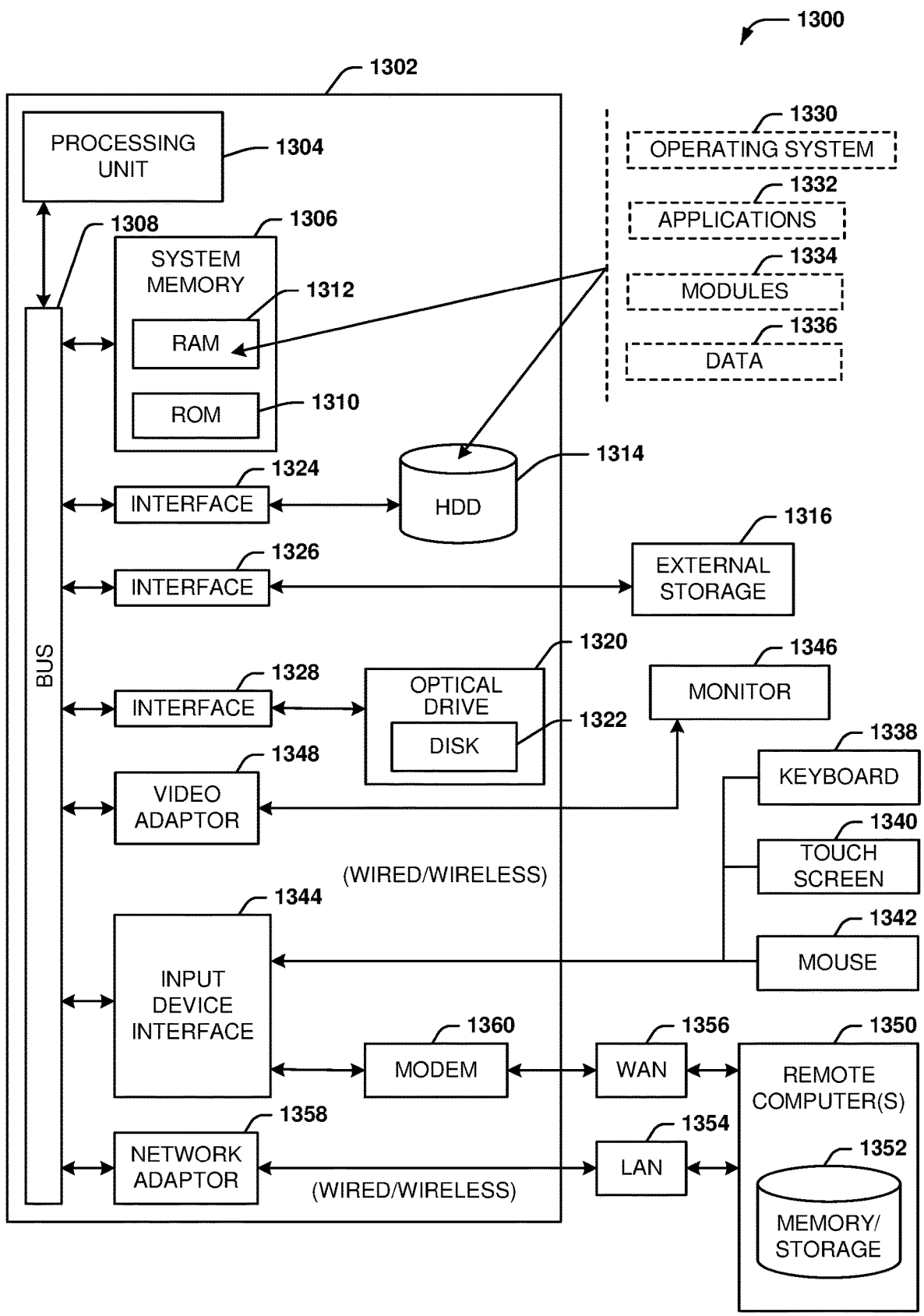
FIG. 13 illustrates an example block diagram of a computer that can be operable to execute processes and methods described here, in accordance with various aspects and example embodiments of the present application.

In order to provide additional context for various embodiments described herein, FIG. 13 and the following discussion are intended to provide a brief, general description of a suitable computing environment 1300 in which the various embodiments of the embodiment described herein can be implemented. For example, one or more of the devices shown in FIG. 6 can have similar components to that of the computer described in FIG. 13.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s)

1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/ storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. A user equipment, comprising:
   a processor; and
   a memory that stores executable instructions that, when executed by the processor, facilitate performance of operations, comprising:
   determining a metric representative of a quality of a communication signal received by the user equipment, wherein the communication signal is received via a mobile network to which the user equipment is registered,
   in response to the metric being determined to have reached a threshold, scanning a group of frequency bands, wherein a first frequency band of the group of frequency bands is associated with a first mobile network operator entity, and wherein a second frequency band of the group of frequency bands is associated with a second mobile network operator entity,
   receiving, via the first frequency band, a first broadcast signal from a first network node device associated with the first mobile network operator entity, wherein the first broadcast signal comprises a first performance parameter and first cost information,
   receiving, via the second frequency band, a second broadcast signal from a second network node device associated with the second mobile network operator entity, wherein the second broadcast signal comprises a second performance parameter and second cost information, and
   in response to an evaluation of the first performance parameter and the first cost information versus the second performance parameter and the second cost information, determining whether to select the first network node device to engage in cellular transmissions between the user equipment and the first network node device.

2. The user equipment of claim 1, wherein the operations further comprise, in response to the determining whether to select the first network node device, selecting the first network node device to engage in the cellular transmissions.

3. The user equipment of claim 1, wherein the metric relates to a signal-to-noise ratio.

4. The user equipment of claim 1, wherein the first performance parameter comprises a throughput representative of a rate of successful delivery of messages sent between the first network node device and the user equipment.

5. The user equipment of claim 1, wherein the first performance parameter comprises a packet latency.

6. The user equipment of claim 1, wherein the first performance parameter relates to an availability of the first frequency band for use by the user equipment.

7. The user equipment of claim 1, wherein the first performance parameter relates to an uplink transmission noise floor.

8. The user equipment of claim 1, wherein the first performance parameter relates to a packet transmission rate.

* * * * *